J. ZAUDERER ET AL
APPARATUS FOR THE SOLUTION OF
LINEAR SIMULTANEOUS EQUATIONS

INVENTORS.
JEROME ZAUDERER
BENJAMIN J. ALECK
BY Virgil F. Davico
Joseph Daleda
ATTORNEYS April 29, 1952

J. ZAUDERER ET AL 2,595,185

APPARATUS FOR THE SOLUTION OF
LINEAR SIMULTANEOUS EQUATIONS

Filed May 18, 1949

2 SHEETS—SHEET 2

INVENTORS.
JEROME ZAUDERER
BENJAMIN J. ALECK
BY *Virgil F. Davis*
*Joseph Daleda*
ATTORNEYS Patented Apr. 29, 1952

2,595,185

UNITED STATES PATENT OFFICE 2,595,185

APPARATUS FOR THE SOLUTION OF LINEAR SIMULTANEOUS EQUATIONS

Jerome Zauderer, New York, and Benjamin J. Aleck, Brooklyn, N. Y., assignors to The M. W. Kellogg Company, Jersey City, N. J., a corporation of Delaware Application May 18, 1949, Serial No. 94,024

2 Claims. (Cl. 235—61)

This invention relates to an apparatus for solving equations and particularly to an apparatus whereby linear simultaneous algebraic equations are solved by the electronic combination of the electrical analogues of the terms of the equations.

The accuracy requirements imposed on the solution of equations defining parameters of a system in many cases are such that mechanical computation of data leaves much to be desired from an accuracy standpoint. The accuracy of prior art computers is dependent largely on the precision with which the component parts are made and assembled. In most cases it is necessary that the solution obtained from the use of prior art computers be purified by a method of successive approximations wherein the solution obtained from each approximation is used as a new set of equations to be solved and the process repeated before a pure and exact solution can be obtained. The accuracy of these computers is also greatly dependent on the number of equations being solved because of the subtraction techniques which are necessary in order to carry out the successive approximation process. Obviously as the number of equations is increased, the time utilized for the preparation of the equations for solution by the prior art methods and apparatus is increased and the accuracy of the solution greatly decreased. The increasingly rigid specifications which must be met by computers in order to realize exact solutions to mathematical problems has made obsolete these prior art computers where accuracy and speed of solution are prime considerations.

Accordingly, it is a primary object of the present invention to provide a novel electronic apparatus using direct current voltages for the solution of linear simultaneous algebraic equations by the electronic combination of the electrical equivalents of the numerical coefficients of the equations.

Another object of the present invention is to provide a novel electronic apparatus using direct current voltages for the solution of linear simultaneous algebraic equations by the electronic combination of the electrical equivalents of the numerical coefficients of the equations wherein the solution of the equations is obtained substantially concurrent with the transformation of the numerical coefficients to their electrical equivalents.

Another object of the present invention is to provide a novel electronic apparatus using direct current voltages for the solution of linear simultaneous algebraic equations whereby the electrical equivalents of the products of the coefficients and their associated unknowns of the simultaneous equations are combined electronically by means of stabilized, degenerative, feedback amplifiers, whose frequency response extends down to zero.

These and other objects, features and advantages of the present invention will be apparent from the following description and claims and the following drawings in which:

Fig. 1 shows in diagrammatic form the basic computing element of the apparatus utilizing a direct current, degenerative feedback amplifier.

Fig. 1*a* shows, in diagrammatic form, the structure of Fig. 1 modified to eliminate potentiometers.

Recent advances in electronic circuit work have brought forth many suitable circuit techniques which have been of material assistance in devising computation systems and which are relatively simple and inexpensive to manufacture.

Of these, the most useful has been the development of operational amplifiers. The term operational amplifier is a generic term applied to a stabilized feedback amplifier of standard design which in conjunction with auxiliary circuits can be used as a mathematical operator. The operation of these amplifiers produces results of a degree of precision heretofore not realized, the precision being substantially independent of the wear or aging of parts.

Figure 1:
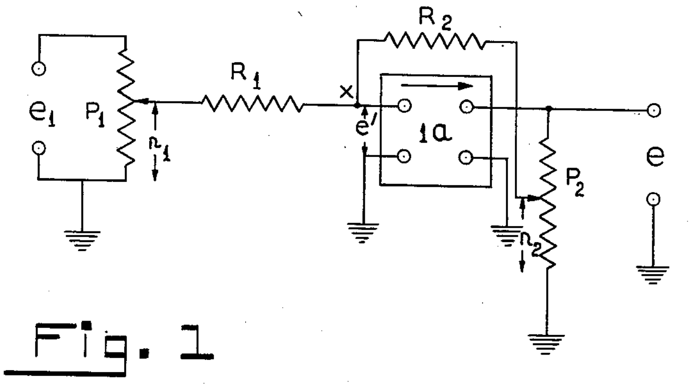

A preferred basic unit of the apparatus of the present invention is illustrated in Fig. 1, which shows in block form a direct current, high gain amplifier, *1a*, in which degenerative feedback voltage is applied from the output of the last stage of amplification to the grid of the first stage of amplification through a voltage divider consisting of resistors $R_1$ and $R_2$. The resistances between the ground and the taps of potentiometers $P_1$ and $P_2$ are $r_1$ and $r_2$, respectively. Applying standard circuit analysis technique for an analysis of the circuit of Fig. 1, the currents flowing to reference point $x$ may be equated to zero.

Let $\alpha$=ratio of tap setting to the total resistance of $P_1$ $\beta$=ratio of tap setting to the total resistance of $P_2$ $A$=magnitude of amplifier gain without feedback $e_1$=input potential $e$=output potential $e'$=potential at point $x$ Assuming there is no flow of current in the amplifier 1a, the following approximated expressions may be written:

$$\frac{\alpha e_1 - e'}{R_1} + \frac{\beta e - e'}{R_2} = 0 \quad (1)$$

$$e = -Ae' \quad (2)$$

Substituting Equation 2 in Equation 1 and rearranging terms, we obtain $$e = -\frac{\alpha e_1\left(\frac{R_2}{R_1}\right)}{\beta + \frac{1}{A}\left(\frac{R_2}{R_1}+1\right)} \quad (3)$$

In the usual case, resistors $R_1$ and $R_2$ are in the order of 100 to 1000 times greater than the maximum values of $r_1$ and $r_2$ so that with the most unfavorable settings of potentiometers $P_1$ and $P_2$, neglect of the values of $r_1$ and $r_2$ in Equation 3 will result in an error of approximately 0.1 to 1 per cent. Further since the amplifier can be designed so that A is of the order of 100,000 or greater, the second term in the denominator of Equation 3 may be rewritten with the maximum errors indicated above as $$\alpha R_2 e_1 + \beta R_1 e = 0 \quad (4)$$

Figure 2:
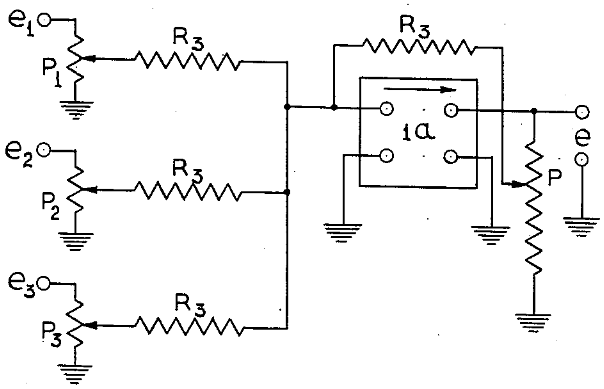
Fig. 2 is Fig. 1 expanded to accommodate three inputs.

If now the set-up shown in Fig. 1 is expanded by connecting additional input voltages through additional potentiometers and equal resistors, as shown in Fig. 2, which illustrates the case for 3 inputs, it can be demonstrated as in the case of a single input that $$\alpha_1 e_1 + \alpha_2 e_2 + \alpha_3 e_3 + \ldots + \alpha_n e_n + \beta e = 0 \quad (5)$$

Therefore, given an equation $$A_1X_1 + A_2X_2 + A_3X_3 + \ldots + A_nX_n = 0 \quad (6)$$

we obtain a voltage proportional to one of the variables, $X_n$ at the output of the amplifier, if potentiometer P is set so that $\beta = A_n$ and voltages $e_1, e_2 \ldots e_n$ proportional respectively to $X_1$, $X_2$ and $X_n$ are applied through potentiometers $P_1$, $P_2 \ldots P_n$ set so that $\alpha_1$, $\alpha_2$ and $\ldots \alpha_n$ are equal respectively to $A_1, A_2 \ldots A_n$. In the case where equations of the type set out in (6) above contain a constant term, this constant term is set directly into the computer based on the analogy that $A_n = K$ and $X_n = 1$ so that $e_n = X_n = 1$ and $\alpha_n = A_n = K$.

Referring to Fig. 1 again, in the case where $R_2 = R_1$, the operational amplifier can be used as a simple sign changer since the output voltage $e$ will be of opposite polarity from that of the input voltage $e_1$.

If there are $n$ variables and $n$ independent equations, $n$ banks of amplifiers are used to obtain one of the $n$ variables at the output of each bank of amplifiers. The algebraic sign of each of the outputs may be changed by applying it directly to an amplifier which has equal input and feedback resistors.

Figure 3:
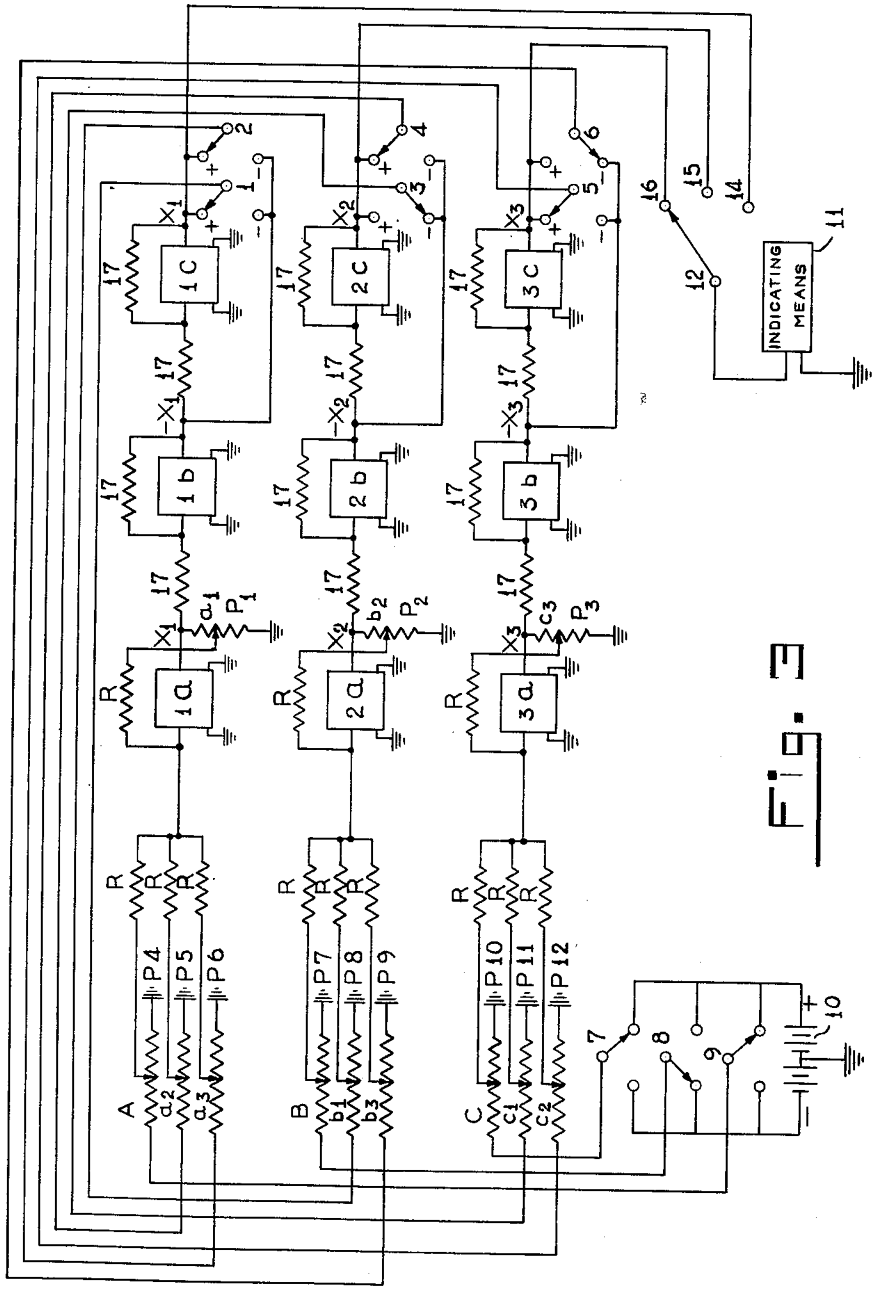
Fig. 3 is a diagrammatic representation of an apparatus adapted to solve three linear simultaneous algebraic equations.

For the purpose of further illustrating the method and apparatus, Fig. 3 represents the manner in which the component parts of the apparatus are interconnected to solve the following set of linear simultaneous algebraic equations:

$$a_1x_1 - a_2x_2 + a_3x_3 = -A \quad (7)$$

$$b_1x_1 + b_2x_2 - b_3x_3 = B \quad (8)$$

$$c_1x_1 + c_2x_2 + c_3x_3 = -C \quad (9)$$

Voltages directly proportional to the values of A, −B and C are applied to the input of amplifiers 1a, 2a and 3a respectively through unit resistance R. This is effected by adjusting potentiometers P-4, P-7 and P-10 respectively so that the potentiometer readings are directly proportional to the values of the constant terms.

In a similar manner, voltages corresponding to the coefficients of the other unknown terms except the one to be solved are applied to the input of the respective amplifiers through unit resistances R by adjusting potentiometers so that the potentiometer readings are proportional to the respective coefficients as follows: for $-a_2$ and $a_3$, potentiometers $P_5$ and $P_6$ respectively; for $b$ and $-b_3$, potentiometers $P_8$ and $P_9$ respectively; and for $c_1$ and $c_2$, potentiometers $P_{11}$ and $P_{12}$ respectively.

The outputs of amplifiers 1a, 2a and 3a are connected to their respective inputs through feedback resistors R and potentiometers $P_1$, $P_2$ and $P_3$, which are adjusted so that their readings are proportional to the coefficients of the unknown terms whose solution is being sought viz. $x_1$, $x_2$ and $x_3$ in the above case.

A voltage proportional to $x_1$ appears at the output of amplifiers 1a and 1c; a voltage proportional to $x_2$ appears at the output of amplifiers 2a and 2c; and a voltage proportional to $x_3$ appears at the output of amplifiers 3a and 3c. Voltages proportional to $-x_1$, $-x_2$, and $-x_3$ appear at the outputs of amplifiers 1b, 2b and 3b respectively. Amplifiers 1c, 2c and 3c are provided even though their output voltages duplicate those of amplifiers 1a, 2a and 3a respectively for the following reason: the internal impedance of amplifiers 1a, 2a and 3a will vary with the setting of their respective input and feedback resistors. The change in output voltage of an amplifier produced by a "load" connected to the output of the amplifier is a function of the internal impedance of the amplifier. Therefore if the input resistors of amplifiers 1a were connected to the outputs of amplifiers 2a and 3a, and the input resistors of amplifier 2a were connected to the outputs of the amplifiers 1a and 3a; etc., the error caused by the loading effect of these resistors on the amplifiers to whose outputs they were connected would be a variable error which would depend on the setting of various resistors. On the other hand amplifiers 1b, 1c, 2b, 2c, 3b and 3c have fixed input and feedback resistors 17 and therefore fixed internal impedances. Hence, by proper design the error produced by the loading effect of the resistors connected to the outputs of the amplifiers can be kept constant and below a predetermined level.

Alternatively, amplifiers can be designed, by methods well known to the art, to have a very low output impedance. This would render unnecessary the use of additional amplifiers as indicated above.

Switches 1 through 9 enable the operator to set the sign + or − for each term of the equation. The direct current source 10, here shown as a battery but which may be any other low impedance stable source of direct current, such as a regulated power supply, is used in conjunction with appropriately adjusted resistors to set the constant terms for each equation. The solutions for $x_1$, $x_2$ and $x_3$ are obtained by reading a voltage-indicating device 11 connected successively by means of a switch to terminals 14, 15 and 16 respectively, which are the output points of amplifiers 1c, 2c and 3c respectively.

Obviously if the numerical coefficients of the equations are too large to permit direct usage as inputs for reasons that the scale of the input resistors are too small, the inputs will have to be treated so that they may be accommodated by the input resistors. In a like manner the output will have to be treated similarly to obtain the true numerical value of the unknowns.

Figure 1A:
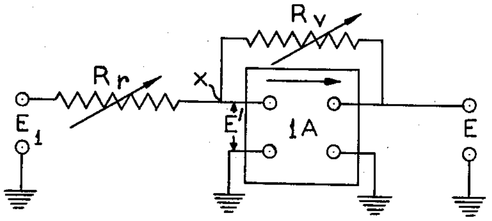

The structure can be redesigned to eliminate the potentiometers entirely. Then it would be necessary to set the coefficients into the computer by means of variable resistors as indicated in Fig. 1a. The disadvantage inherent in this method is the fact that the settings of these variable resistors would be proportional to the reciprocal of the coefficients of the unknowns in the equations. This would necessitate an additional step in the preparation of the equations before setting them into the computer.

As in the case of Fig. 1, applying standard circuit analysis technique and assuming no flow of current in amplifier 1a, the following expressions may be written:

$$\frac{E_1-E'}{R_r}+\frac{E-E'}{R_v}=0 \quad (10)$$

$$E=-A_0E' \quad (11)$$

where $A_0$ is the magnitude of the amplifier gain without feedback, $E_1$ is the input potential, E is the output potential, and E' is the potential at point $x$. Substituting Equation 11 in Equation 10 and rearranging terms, the following expression is obtained:

$$E=-\frac{R_v}{R_r}\cdot\frac{1}{1+\frac{1}{A_0}\left[1+\frac{R_v}{R_r}\right]}E_1 \quad (12)$$

Since $A_0$, the gain of the amplifier without feedback, can be made very large as compared with unity and a ratio of $R_v/R_r$ can in practice be kept to a value of less than 100, the second term in the denominator of Equation 12 may be neglected and the equation re-written with an error that can be kept arbitrarily small, in the order of less than 0.1%.

$$E=-\frac{R_v}{R_r}\cdot E_1 \quad (13)$$

or $$\frac{E}{R_v}+\frac{E_1}{R_r}=0 \quad (14)$$

If the circuit of Fig. 1 is expanded to accommodate several inputs by connecting additional input voltages through additional resistors similar to input resistor $R_r$, it can be shown that:

$$\frac{E_1}{R_r}+\frac{E_x}{R_x}+\frac{E_y}{R_y}+\ldots+\frac{E}{R_v} \quad (15)$$

Given an equation:

$$a_1x_1+a_2x_2+a_3x_3+\ldots+a_nx_n=0 \quad (16)$$

it is possible to obtain a voltage proportional to one of the variables, say $x_k$, at the output of the amplifier if resistor $R_v$ is adjusted so that its value is proportional to $$\frac{1}{a_k}$$

and voltages proportional respectively to $$x_1, x_2 \ldots x_n$$

are applied to the input of the amplifier through resistors proportional respectively to $$\frac{1}{a_1}, \frac{1}{a_2}, \ldots \frac{1}{a_n}$$

Since many variations can be made in the method and apparatus, as discussed for illustrative purposes, without deviating far from the fundamental principles upon which the present invention bases its novelty it is herewith noted that the material set forth shall be interpreted as illustrative and not in a limiting sense.

What is claimed is:

1. An apparatus for solving linear simultaneous algebraic equations wherein the solutions of said equations as outputs of said apparatus and inputs to an indicating means is substantially concurrent with the application of the electrical equivalents representing the constant terms and the products of the coefficients and of their associated unknowns in said equations as inputs to said apparatus, comprising a plurality of networks, each network including a high gain, direct current voltage amplifier and sign changing means, and input means for each network comprising resistors and potentiometers adapted to operate on the output voltages of the other of said networks to provide voltages proportional to the products of the coefficients of said equations and of their associated unknowns as represented by said output voltages, degenerative feedback means, consisting of a resistor and a potentiometer, connecting the output of each high gain amplifier to its input, adapted to operate on said output to provide a feedback voltage representing the product of a coefficient and its associated unknown as represented by said output and having a polarity corresponding to the algebraic sign of said product, and means connected to each network through a resistance and a potentiometer, adapted to provide direct current voltages proportional to the magnitudes of the constant terms in said equations and with polarities corresponding to the algebraic signs thereof, the output of each high gain amplifier being supplied also to the input of the first one of said sign changing means in each network, said first sign changing means comprising a circuit having a unity gain amplifier with equal input and feedback resistors, the output of said first sign changing means also being applied to the input of a second sign changing means substantially identical to said first sign changing means, the output of each of said networks being applied to the input means of the remainder of said plurality of networks, and indicating means connected to the outputs of said plurality of networks.

2. A simultaneous equation solver comprising a plurality of networks equal in number to that of the equations to be solved, each network including a series of high gain, direct current voltage amplifiers with degenerative feedback, means for applying to the input of each network a direct current voltage whose magnitude is proportional to the constant term of one of said equations and whose polarity corresponds to the algebraic sign of said term, means for applying certain of the outputs of said networks to the inputs of each network through potentiometers producing voltages proportional to the products of said outputs and of the coefficients of the unknowns represented by said outputs, means for combining said voltages from said potentiometers and said direct current voltage and applying the algebraic sum to the input of first of said amplifiers in series, means applying the output of said first amplifier to the input of a first sign changing means consisting of a second amplifier in series having a degenerative feedback producing a gain of unity, a second sign changing means substantially identical to said first sign changing means and connected in series therewith and means for applying the outputs of said networks to means for indicating the values of said outputs, said outputs being taken from either said first or second sign changing means.

JEROME ZAUDERER.
BENJAMIN J. ALECK.

REFERENCES CITED

The following references are of record in the file of this patent:

UNITED STATES PATENTS

| Number | Name | Date |
|---|---|---|
| 2,454,549 | Brown et al. | Nov. 23, 1948 |

OTHER REFERENCES

"Analysis of Problems in Dynamics by Electronic Circuits" by J. R. Ragazzini, R. H. Randall and F. A. Russel, Proceedings of the I. R. E.; vol. 35, No. 5, pp. 444–452, May 1947.

"An Electronic Simultaneous Equation Solver," Journal of Applied Physics, volume 19, No. 4, pp. 339–345; April, 1948.